United States Patent [19]

Nakazawa et al.

[11] Patent Number: 5,554,326
[45] Date of Patent: Sep. 10, 1996

[54] CONTROL METHOD OF INJECTION MOLDING MACHINE

[75] Inventors: Makoto Nakazawa; Toshiyasu Koda; Tyuyoshi Arai, all of Nagano, Japan

[73] Assignee: Nissei Plastic Industrial Co., Ltd., Nagano-ken, Japan

[21] Appl. No.: 421,886

[22] Filed: Apr. 14, 1995

[30] Foreign Application Priority Data

Apr. 15, 1994 [JP] Japan .................................. 6-102335

[51] Int. Cl.⁶ .................................................. B29C 45/77
[52] U.S. Cl. ..................... 264/40.1; 264/69; 264/328.13; 425/145; 425/166
[58] Field of Search ................................... 264/40.1, 40.5, 264/40.7, 69, 328.1, 328.8, 328.12, 328.13; 425/145, 149, 150, 166

[56] References Cited

U.S. PATENT DOCUMENTS

| 4,846,651 | 7/1989 | Matsuda et al. | 425/145 |
| 5,202,066 | 4/1993 | Furusawa et al. | 264/69 |
| 5,482,662 | 1/1996 | Nakamura et al. | 425/145 |
| 5,494,427 | 2/1996 | Arai | 425/145 |

FOREIGN PATENT DOCUMENTS

| 1-280524 | 11/1989 | Japan . |
| 3-39816 | 6/1991 | Japan . |

*Primary Examiner*—Jill L. Heitbrink
*Attorney, Agent, or Firm*—Birch, Stewart, Kolasch & Birch, LLP

[57] ABSTRACT

A control method of an injection molding machine includes the steps of advancing a screw 2, injecting and filling the resin in a barrel cylinder 3 into a mold 4 to fill the mold, and then applying a predetermined holding pressure to the resin in the mold 4. The control method further includes the steps of performing an injecting and filling by using an injection cylinder 5 having a double-rod piston 6 which can advance and retreat the screw 2, and then controlling the injection cylinder 5 by a controlling signal Dc including a predetermined alternating current signal in such a manner that the screw 2 is reciprocated in a longitudinal direction as a center with an advance finish and. stop position Xs and a position at which the screw is moved so as to retreat by a predetermined distance from the advanced finish and stop position Xs. Thereby, the mold failure such an overpack and a burr is eliminated.

7 Claims, 3 Drawing Sheets

CONTROL METHOD OF INJECTION MOLDING MACHINE

BACKGROUND OF THE INVENTION

1. Field of the Invention

The present invention relates to a control method of an injection molding machine preferable to use it for molding a relatively thin molding article such as a compact disk.

2. Description of the Relevant Art

Up to now, in a case where a molding is performed by means of an injection molding machine, as disclosed in Japanese Patent Publication No. 3(1991)-39816, at the time of injection and filling, a screw was advanced by speed control to inject and fill the resin in a barrel cylinder into a mold, and thereafter, a predetermined holding pressure was applied to the resin in the mold by pressure controlling the screw. In this resin, if the screw is advanced through the speed control, the load pressure of the screw slowly rises because the resin is filled in the mold. When the screw reached a speed-pressure changing point, the screw was changed from the speed control to the pressure control and predetermined holding pressures, for example, a first holding force and a second holding force were applied successively to the resin in the mold for a predetermined set time respectively.

Meanwhile, in a case where a relatively thin molding article such as a compact disk or laser disk is molded, there is used a method in which the holding pressure is stressed and weakened according to a pulse width and a pulse interval of a pulse signal at the time of applying the holding pressure, as disclosed in Japanese Patent Laying Open No. 1(1989)-280524, since resin hardly enters the entire mold cavity, besides the resin in the cavity of the die is easily applied with stresses. That is apparently due to the fact that the screw cannot be controlled in the longitudinal direction and cannot apply a positional vibration in the longitudinal direction, since the injection cylinder having a one-side rod piston is used in the apparatus of this Jpaneses Patent.

Accordingly, there are problems in the case of existing methods wherein the resin easily enters into the entire mold cavity and the stress of the resin in the mold cavity can be decreased. However, a holding pressure becomes unstable and a molding failure such as an overpack and a burr and the like easily occurs, and the weight fluctuation of molding articles easily occurs due to the fluctuation of the amount of resin to be injected into the mold cavity when the pressure applied to the resin fluctuates due to the disturbance of the flowing state, temperature or the like of the resin.

SUMMARY OF THE INVENTION

It is an object of the invention to provide a control method of an injection molding machine, which prevents the mold failure such as an overpack and a burr and the like from occurring, and improves a quality and a yield of the molding article by providing a uniform weight of the molding articles.

In order to attain the above mentioned object, the present invention comprises a control method of an injection molding machine including the steps of advancing a screw 2, injecting and filling the resin in a barrel cylinder 3 into a mold 4 to fill the mold, and then applying a predetermined holding pressure to the resin in the mold 4, further the control method comprises the steps of performing an injecting and filling by using an injection cylinder 5 having a double-rod piston 6 which can advance and retreat the screw 2, and then controlling to drive the injection cylinder 5 by a controlling signal Dc including a predetermined alternating current signal, for example, sine-wave alternating current signal Pc in such a manner that the screw 2 vibrates in a longitudinal direction as a center with an advance finish and stop position Xs and a position at which the screw is moved so as to retreat by a predetermined distance from the advance finish and stop position Xs.

In this case, the control method may comprise the steps of preliminarily setting the advance finish and stop position Xs of the screw 2 based on the amount of the resin required for the injecting and filling, a predetermined mold clamping pressure Pc, and a mold opening amount So based on the filling of the resin, and performing an injection and filling and then stopping the screw 2 during a predetermined time ts at the advance finish and stop position Xs or the position at which the screw is moved so as to retreat by the predetermined distance from the advance finish and stop position, vibrating the screw 2 as the center with the advance finish and stop position Xs and the position at which the screw is moved so as to retreat by the predetermined distance from the advance finish and stop position xs, and applying a holding pressure based on the mold clamping pressure Pc opened by the mold opening amount So.

Therefore, according to the control method of the present invention, since the screw 2 has a double-rod piston which can advance and retreat, and the injection cylinder 5 in which the fore oil chamber and the rear oil chamber are identical in pressure received area with each other is used, an advance and retreat control and a positioning control of the screw 2 can be performed by the servo valve 7, and an easy and accurate control and the control of high responsibility are realized.

And, if the screw 2 is advanced from the injection starting position at the time of injection and filling, the resin in the barrel cylinder 3 is injected and filled in the mold 4. When the screw 2 is reached to the advance finish and stop position Xs due to the injection and filling, the control signal Dc including the sine-wave alternating current signal Ac is sent from the control function section 8 to the servo valve 7. Thereby, the piston 6 of the injection cylinder 5 is oscillated in the longitudinal direction based on the sine-wave alternating current signal Ac, the screw 2 vibrates in the longitudinal direction as a center with the advance finish and stop direction Xs. As a result, the resin easily enters into the entire mold cavity and the stress of the resin in the mold cavity is decreased. Moreover, in case of a predetermined kind of the molding article and the like, the screw 2 may be vibrated at a position where the screw 2 is moved by a predetermined distance from the advance finish and stop position Xs. Thereby, the remained stress is eliminated and the internal strain in the mold cavity is decreased.

Furthermore, on this occasion, the advanced finish and stop position Xs of the screw 2 based on the amount of the resin required for the injection and filling, and the mold opening amount So based on the filling of the resin are set preliminarily, respectively, the normal amount of the resin required to obtain a good article is injected and filled in the die 4 when the screw 2 is moved by the injection stroke from the injection starting position to the advance finish and stop position Xs. If the pressure of the resin becomes greater than the mold clamping pressure Pc when the resin is filled in the mold 4, the flow of the resin and the exhaust of the gas are accelerated because the mold 4 is opened by the mold opening amount So. In this state also, since the mold 4 is applied with at least the mold clamping pressure Pc, a predetermined holding pressure based on the mold clamping pressure Pc is applied to the resin in the mold 4 when the screw 2 is stopped at the advanced finish and stop position Xs or the position where the screw 2 is moved so as to retreat by a predetermined distance from the position Xs.

Accordingly, in a case where such a control is repeated for every molding cycle, even if the fluctuation of the pressure and the like on the resin occurs due to a disturbance in the flowing state of the resin or the temperature and the like, the molded article based on the always constant normal amount of the resin is obtained, and a mold failure such as an overpack and a burr and the like is prevented from occurring.

DETAILED DESCRIPTION OF THE PREFERRED EMBODIMENTS

Preferred embodiments of the present invention are described in detail by referring to the accompanying drawings.

First, the constitution of an injection molding machine for executing the molding method of the present invention is described below by referring to FIG. 2.

Figure 2:
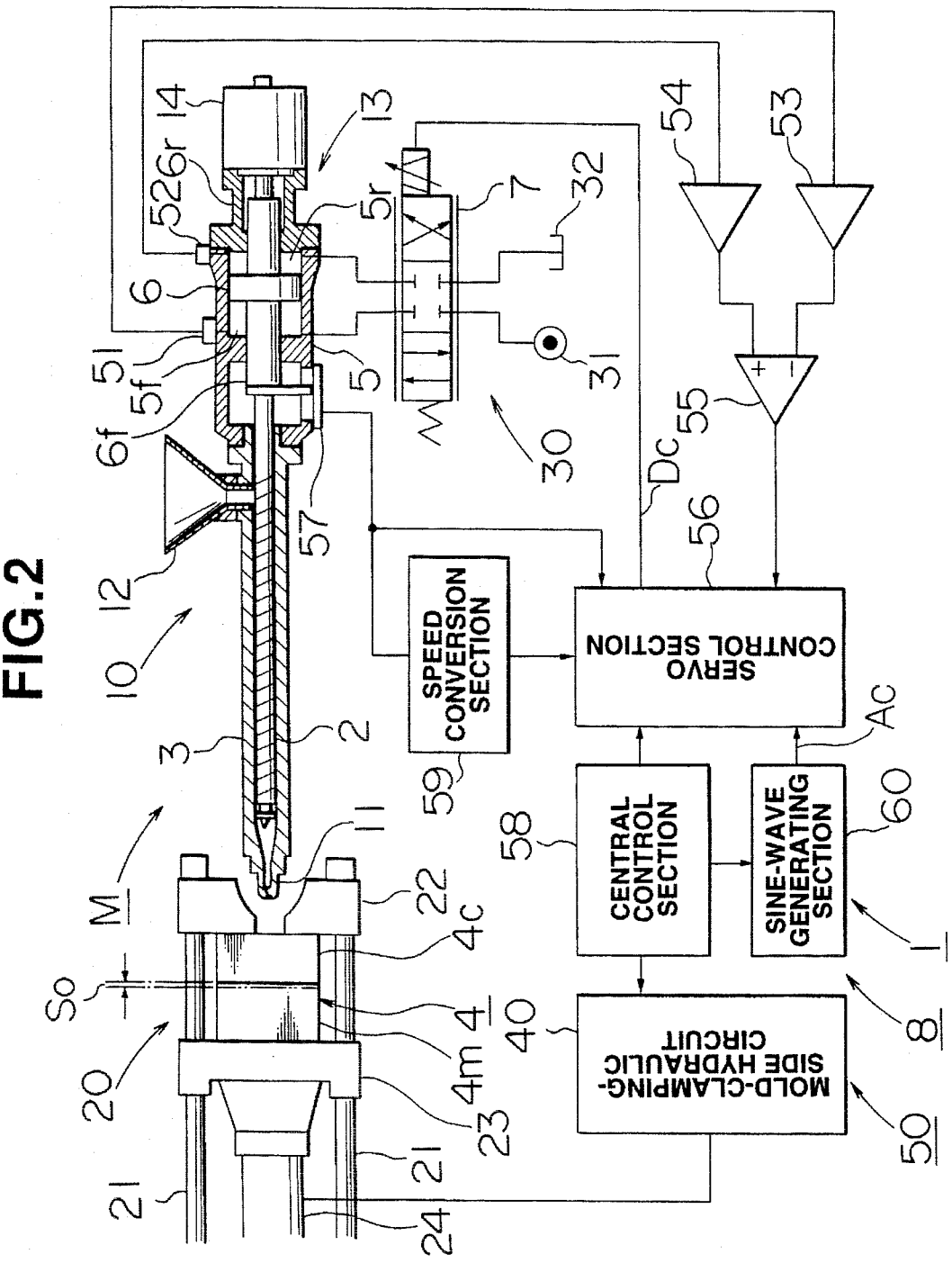
FIG. 2 is a block diagram of an injection molding machine for a control method of the present invention.

In FIG. 2, an injection molding machine shown by symbol M is provided with an injection unit 10 and a mold clamping unit 20. The injection unit 10 is provided with a barrel cylinder 3 having an injection nozzle 11 at its front end and a hopper 12 at its rear end, respectively. A screw 2 is inserted into the barrel cylinder 3 and a screw driving section 13 is connected to the rear end of the barrel cylinder 3. The screw driving section 13 is provided with an injection cylinder 5 built-in a double-rod piston 6. A front rod 6f protruding forward from the piston 6 is connected to the rear end of the screw 2 and the shaft of an oil motor 14 attached to the injection cylinder 5 is spline-connected with a rear rod 6r protruding backward from the piston 6.

On the other hand, the mold clamping unit 20 is provided with a plurality of tie bars 21 . . . , which supports a fixed mold 4c by a fixed plate 22 disposed on the front end of the tie bars 21 . . . and a movable mold 4m by a movable plate 23 slidably provided on the tie bars 21 . . . And, the movable plate 23 can be moved by a mold clamping cylinder 24. In this case, the fixed mold 4c and the movable mold 4m constitute a mold 4 and a predetermined mold opening amount So is set to the mold 4. Therefore, the mold 4 can be opened by the mold opening amount so from the fully closed state.

Moreover, an injection-unit-side hydraulic circuit 30 is connected to the injection cylinder 5 and a mold-clamping-side hydraulic circuit 40 is connected to the mold clamping cylinder 24. The port B of the servo valve 7 is connected to a rear oil chamber 5r of the injection cylinder 5, the port P thereof is connected to a hydraulic source (hydraulic pump and accumulator) 31, and the port T thereof is connected to an oil tank 32.

Moreover, a controller 50 is connected to the hydraulic circuits 30 and 40. First, a pressure sensor 51 using a strain gauge for detecting the oil pressure of the front oil chamber 5f and the same-type pressure sensor 52 for detecting the oil pressure of the rear oil chamber 5r are disposed on the injection cylinder 5. Then, the pressure sensors 51 and 52 are connected to the input section of a deviation detector 55 through head amplifiers 53 and 54 respectively. Thereby, the deviation between the oil pressure of the front oil chamber 5f and that of the rear oil chamber 5r can be obtained at the output section of the deviation detector 55. Thus, the deviation becomes as a detected-pressure information showing the pressure of the screw 2 and it is sent to a servo control section 56. A position detector 57 is provided for detecting the position of the screw 2. The positional information detected by the detector 57 is sent to a central control section 58 through the servo control section 56 as well as converted to a detected-speed information through a speed conversion section 59. The detected-speed information is sent to the servo control section 56 connected to the central control section 58.

Also, the output of the servo control section 56 is sent to the servo valve 7. The servo control section 56 and the mold-clamping-side hydraulic circuit 40 are connected to the central control section 58.

Figure 3:
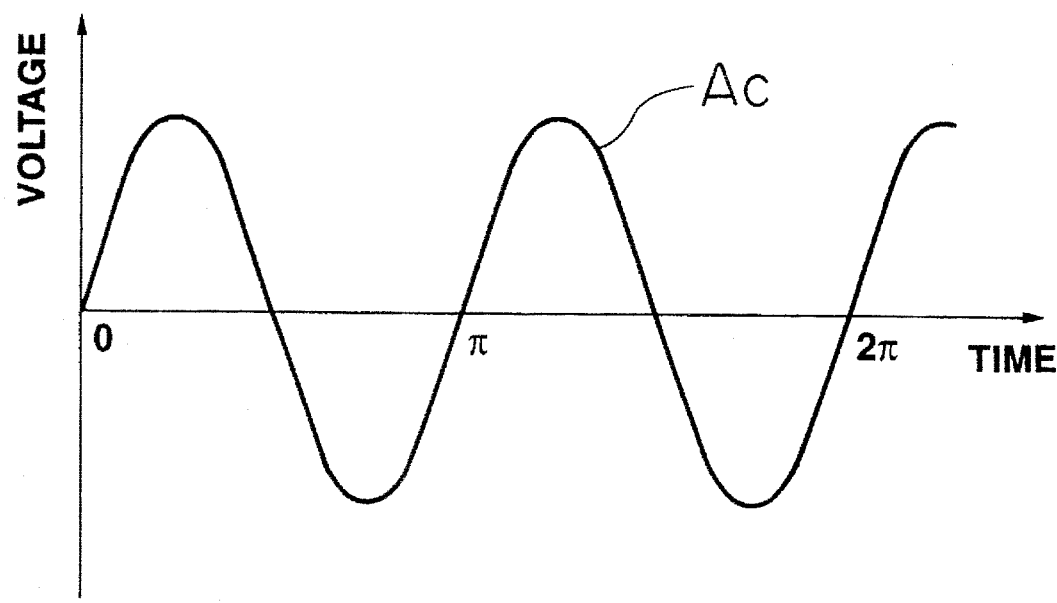
FIG. 3 is a graph of a sine-wave alternating current signal used for a control method of the present invention.

Reference numeral 60 represents a sine-wave generating section disposed in the control device 1. The sine-wave generating section 60, the servo control section 56 and the central control section 58 constitute a control function section 8. The sine-wave generating portion 60 generates a sine-wave alternating current signal Ac shown in FIG. 3, which is sent to the servo control section 56. Moreover, a frequency and an amplitude of the sine-wave alternating current signal Ac can be set suitably, the conditions of frequency (usually approx. 50 Hz) and amplitude are set preliminarily taking into consideration the shape of the molding article and the material to be molded, etc.

Accordingly, the basic operation of the controller 50 is as follows. First, the servo control section 56 compares the detected-speed information obtained from the speed conversion section 59 with the set-speed information sent from the central control section 58 at the time of speed control, and sends the speed control information according to the deviation between the detected-speed information and the set-speed information to the servo valve 7 to feedback-control the advance speed of the screw 2. Moreover, at the time of pressure control, the servo control section 56 compares the selected-pressure information obtained from the deviation detector 55 with the set-pressure information (e.g. holding pressures Pm, Pn and the like) sent from the central control section 55 and sends the pressure control information according to the deviation between the detected-pressure information and the set-pressure information to the servo valve 7 to feedback-control the pressure of the screw 2. Furthermore, at the time of position control, the section 56 compares the detected-position information obtained from the position detector 57 with the set-position information (e.g. advance finish and stop position Xs, the position xf nearer than the position of the advance finish and stop position Xs and the like) sent from the central control section 58 and sends the position control information according to the deviation between the detected-position information and the set-position information to the servo valve 7 to feedback-control the position of the screw 2. Furthermore, the servo control section 56 sends the set-pressure information (e.g. mold clamping pressure Pc and the like) from the central control section 58 to the mold-clamping-unit-side hydraulic circuit 40 and drives the mold clamping cylinder 24 to open-loop-control the mold clamping pressure.

Next, the control method according to the present invention using an injection molding machine M will be described hereinafter with reference to FIG. 1 and FIG. 2.

The command values concerning the advance finish and stop position Xs, a position Xf nearer than the advance finish and stop position Xs, a mold clamping pressure Pc, a holding pressures Pm, Pn and the like are set to the central control section 58 as the set information. In this case, the advance finish and stop position Xs is a position where the screw 2 advances at the time of injection and filling and stops when the filling is finished. Thereby, when the screw 2 moves through the injection stroke from the injection start position to the advance finish and stop position Xs, the normal amount of resin is injected into the mold 4. The position Xf nearer than the advance finish and stop position Xs, the normal amount of resin is injected into the mold 4. The position Xf nearer than the advance finish and stop position Xs is a position where starting the braking of the screw 2, which is necessary to stop the screw 2 at the advance finish and stop position Xs. Therefore, it is necessary to set the position Xf by considering the inertia of the screw 2 so that the screw 2 stops in the minimum distance. Moreover, the mold clamping pressure Pc is set lower (approx. 60%) than the original mold clamping pressure in such a manner that the mold 4 opens by the mold opening amount So when it is filled with resin.

On the other hand, in the injection process, the screw 2 is advanced from the injection start position by speed control at a speed of V. Thereby, the measured resin in the barrel cylinder 3 is injected and filled into the cavity of the mold 4. When the screw 2 advances upto the position Xf along the line of reaching it to the advance finish and stop position Xs, the braking of the screw 2 is started to make the screw 2 stop at the advance finish and stop position Xs. Because the screw 2 is braked by controlling the injection cylinder 5 having the double-rod piston 6 by the servo valve 7, the screw is stopped quickly, stably, and securely.

The screw 2 is stopped at the advance finish and stop position Xs for the predetermined time "ts" by positioning control. The positioning control of the screw 2 is securely and accurately performed because the injection cylinder 5 having the double-rod piston 6 is controlled by the servo valve 7. In this case, in case of a predetermined kind of molded article (compact disk and the like), the screw 2 may be stopped at a position where the screw 3 is moved so as to retreat by a slight distance from the advance finish and stop position Xs. Thereby, the remained pressure is eliminated and the generation of an internal strain is controlled.

At the advance finish and stop position Xs or the position where the screw 2 is moved so as to retreat by a predetermined distance from the advance finish and stop position Xs, the servo control section 56 superimposes the sine-wave alternating current signal AC sent from the sine-wave generating section 60 in the control function section 8 onto the central signal Dc sent to the servo valve 7. As a result, the piston 6 of the injection cylinder 5 vibrates in the longitudinal direction based on the sine-wave alternating current signal Ac. Thereby, the screw vibrates in the longitudinal direction as a center with the advance finish and stop position Xs or the position where the screw 2 is moved so as to retreat by a predetermined distance from the advance finish and stop position Xs. Therefore, the resin enters easily into the entire mold cavity, and the stress of the resin (internal strain) in the mold cavity is decreased.

Figure 1:
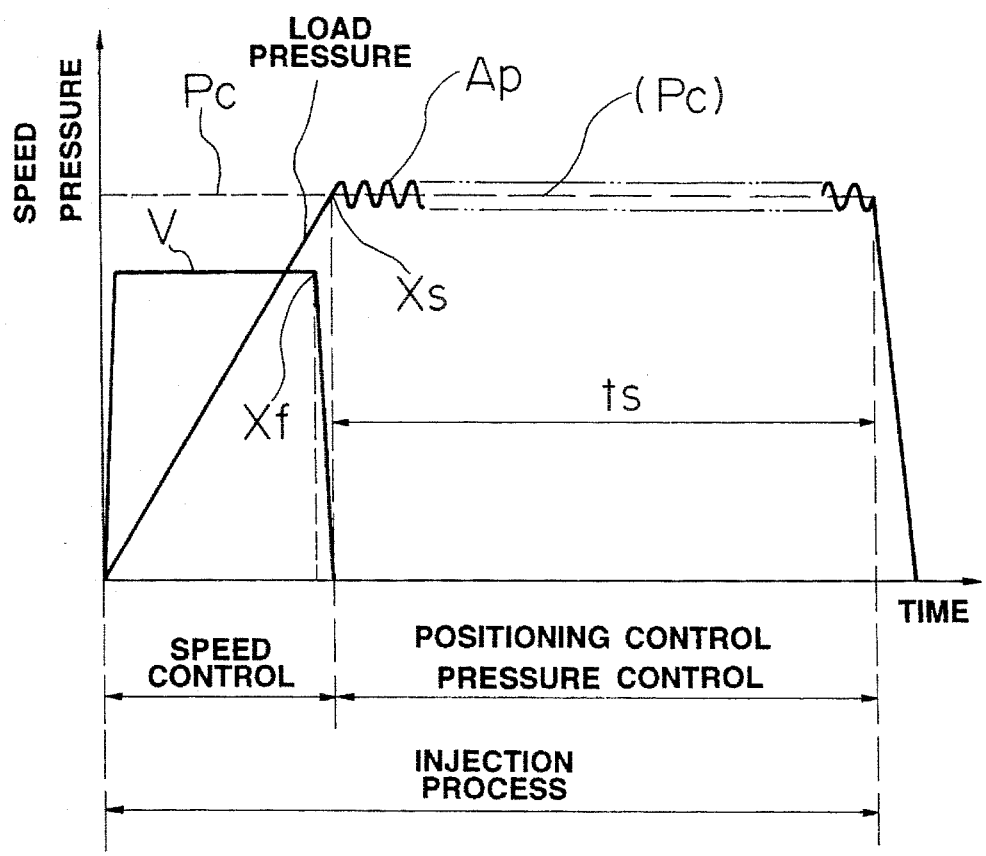
FIG. 1 is a characteristic diagram of speed and pressure of an injection process in a case of molding according to a control method of the present invention.

The speed control pattern shown in FIG. 1 is an example of speed control in the first speed range. However, it is possible to control the speed by various speed ranges (e.g. second and third speed ranges) successively. Therefore, by repeating the above control for every molding cycle, molding articles based on the always constant normal amount of resin are obtained and any molding failure is eliminated.

Since the mold 4 is applied with a relatively low mold clamping pressure Pc, the resin is fitted into the mold 4. If the pressure of the resin in the mold 4 becomes greater than the mold clamping pressure Pc, the mold 4 is opened by the mold opening amount So. Thereby, the cavity of the mold 4 is enlarged, and then the flow of the resin and the exhaust of the gas are accelerated. Also, during the screw 2 is stopped at the advance finish and stop position xs, the resin in the mold 4 is applied with at least predetermined holding pressure based on the mold clamping pressure Pc. And, at this occasion, since the screw 2 vibrates in the longitudinal direction, the magnitude of the determined holding pressure based on the molding clamping pressure Pc vibrates (increases or decreases) according to the sine-waveform Ap as a center with the predetermined holding pressure based on the mold clamping pressure Pc, as shown in FIG. 1.

Therefore, in the control method according to the present invention, the normal amount of resin is always filled into the mold cavity even if the pressure applied to the resin is fluctuated due to the disturbances of the flowing state, temperature and the like of the resin, and any molding failure is eliminated by providing a uniform weight of the molding articles. Moreover, even if the mold clamping pressure is not accurately controlled by using open-loop control, always the normal amount of resin is stably filled into the mold 4. An overpack and a burr and the like is not prevented from occurring.

Moreover, it is also possible to re-clamp the mold 4 by stopping the screw 2 after advancing it upto the advance finish and stop position Xs then retreating it upto a position nearer than the advance finish and stop position xs, and by applying a re-clamping pressure (100%) higher than the mold clamping pressure Pc (approx. 60%) to the mold 4. Also, in this case, because the screw 2 is once stopped at the advance finish and stop position Xs, the normal amount of resin can be obtained at this point in time and a proper amount of return resin in re-clamping can be allowed by retreating the screw 2 upto a position nearer than the advance finish and stop position Xs.

The embodiment of the present invention are described above in detail. However, the present invention is not restricted to the embodiments. For example, the sine-wave alternating current is exemplified above. However, the use of other similar alternating currents such as a triangle-wave and the like are not prevented. Further, there is exemplified a case where the holding pressure is applied from the mold-side. However, the holding pressure maybe applied from the screw-side. Otherwise, the detailed constitution, technique and the like of the present invention can be optionally modified as long as they are not deviated from the gist of the present invention.

What is claimed is:

1. A control method of an injection molding machine including the steps of molding by advancing a screw, injecting and filling the resin in a barrel cylinder into a mold to fill the mold, and then applying a predetermined holding pressure to the resin in the mold, characterized in that the control method comprises the steps of:

performing an injecting and filling by using an injection cylinder having a double-rod piston which can advance and retreat the screw; and then controlling to drive the injection cylinder by a controlling signal including a predetermined alternating current signal in such a manner that the screw vibrates in a fore and rear direction as a center with a advance finish and stop position and a position at which the screw is moved so as to retreat by a predetermined distance from the advance finish and stop position.

2. A control method of an injection molding machine according to claim 1, characterized in that the alternating current signal is a sine-wave alternating current signal.

3. A control method of an injection molding machine according to claim 1, characterized in that the injection cylinder is controlled by a servo valve.

4. A control method of an injection molding machine according to claim 1, characterized in that the control method comprises the steps of:

preliminarily setting the advance finish and stop position of the screw based on the amount of the resin required for the injecting and filling, a predetermined clamping pressure of the die, and an opening amount of the die based on the filling of the resin;

performing an injection and filling, and then stopping the screw during a predetermined time at the advance and stop position or a position at which the screw is moved so as to retreat by the predetermined distance from the advance and stop position;

vibrating the screw as the center with the distance finish and stop position and the position at which the screw is moved so as to retreat by the predetermined distance from the advance and stop position; and applying a holding pressure based on the mold clamping pressure to the die opened by the opening amount of the die.

5. A control method of an injection molding machine according to claim 2, characterized in that the injection cylinder is controlled by a servo valve.

6. A control method of an injection molding machine according to claim 2, characterized in that the control method comprises the steps of:

preliminarily setting the advance finish and stop position of the screw based on the amount of the resin required for the injecting and filling, a predetermined clamping pressure of the die, and an opening amount of the die based on the filling of the resin;

performing an injection and filling, and then stopping the screw during a predetermined time at the advance and stop position or a position at which the screw is moved so as to retreat by the predetermined distance from the advance and stop position;

vibrating the screw as the center with the distance finish and stop position and the position at which the screw is moved so as to retreat by the predetermined distance from the advance and stop position; and applying a holding pressure based on the mold clamping pressure to the die opened by the opening amount of the die.

7. A control method of an injection molding machine according to claim 3, characterized in that the control method comprises the steps of:

preliminarily setting the advance finish and stop position of the screw based on the amount of the resin required for the injecting and filling, a predetermined clamping pressure of the die, and an opening amount of the die based on the filling of the resin;

performing an injection and filling, and then stopping the screw during a predetermined time at the advance and stop position or a position at which the screw is moved so as to retreat by the predetermined distance from the advance and stop position;

vibrating the screw as the center with the distance finish and stop position and the position at which the screw is moved so as to retreat by the predetermined distance from the advance and stop position; and applying a holding pressure based on the mold clamping pressure to the die opened by the opening amount of the die.

* * * * *